3,298,975
EXPANDABLE PARTIALLY-FOAMED AND CURED POLYPROPYLENE COMPOSITION

George B. Feild, New Castle, and Paul L. Johnstone, Greenville, Del., assignors to Hercules Incorporated, a corporation of Delaware
No Drawing. Filed Mar. 18, 1966, Ser. No. 535,370
4 Claims. (Cl. 260—2.5)

This application is a continuation-in-part of our application Serial No. 230,739, filed October 15, 1962, and now abandoned.

This invention relates to the manufacture of shaped articles from polypropylene foam and more particularly to polypropylene expandable pellets and the preparation of shaped articles therefrom.

Many attempts have been made to produce foamed articles from expandable pellets, but only a few thermoplastic substances can be used for such purposes. For the most part, the expandable pellets used for such a process are already expanded to a high degree and the article is formed by welding these expanded particles together. As a result, many difficulties are encountered. In the first place, great care must be taken in controlling the temperature at which such expanded particles are welded since too high a temperature will result in complete collapse of the expanded particles. In the second place, because of the difficulty in welding these particles together without collapse thereof, the welds are frequently imperfect and usually are subject to fracture at the weld seam on impact as when dropped, etc.

Now in accordance with this invention it has been found that shaped articles can be produced from expandable pellets which have high impact strength and are free from weld seams between the particles and, hence, free from fracture at the welds. This is accomplished by partially filling a mold for the desired shaped article with partially expanded pellets comprising a mixture of stereoregular polypropylene, a blowing agent and a poly(sulfonazide) as cross-linking agent, closing and heating said mold to a temperature above the softening temperature of said pellets, said temperature being sufficient to release the gas from the blowing agent to cause the pellets to expand and fill the mold, to complete the cross-linking reaction, and to fuse the expanded pellets into an integral cellular structure.

The partially expanded polypropylene pellets of this invention and used in this process of preparing shaped articles are prepared by intimately mixing stereoregular polypropylene, a poly(sulfonazide) as cross-linking agent, and a blowing agent and passing the mixture, or blend, through an extruder at a temperature above the softening temperature of the polymer, to form a partially cross-linked and partially expanded strand which is then chopped into pellets. Another method of preparing these partially expanded pellets is to blend the polypropylene, blowing agent, and poly(sulfonazide) on a mill at a temperature such that the mixture is softened sufficiently to work on the mill and at the same time effect some cross-linking and expansion of the blend. The blend is then sheeted off the mill and the sheet, which is partially expanded and cross-linked, can then be chopped into pellets. The amount of this partial cross-linking and blowing must be such that from about 5% to about 75% of the potential blow of the mixture has been effected, preferably from about 20% to about 75%, and more preferably from about 50% to about 75%. This partial blowing and cross-linking can be effected by a variety of means, as for example, by adjusting the time of heating, such as the residence time in the extruder or on the mill, the temperature at which the partial expansion and cross-linking are carried out, etc.

Any stereoregular polypropylene can be used to prepare the expandable polypropylene compositions in accordance with this invention, but generally polypropylenes have a reduced specific viscosity (RSV) of from about 1 to about 5 and, more preferably, about 2 to about 4, are used, said reduced specific viscosity being determined on a 0.1% solution of the polymer in decahydronaphthalene at a temperature of 135° C.

Any of the well-known chemical blowing agents can be used in the preparation of the expandable polypropylene pellets in accordance with this invention, as for example, azo bis(formamide), diazoaminobenzene, N,N'-dinitrosopentamethylene tetramine, N,N'-dimethyl-N,N'-dinitrosoterephthalamide, p,p'-oxy-bis(benzene sulfonyl semicarbazide), azo bis(isobutyronitrile), p,p'-oxy-bis-(benzene sulfonyl hydrazide), p,p'-diphenyl-bis(sulfonyl hydrazide), benzene-sulfonyl hydrazide, m-benzene-bis-(sulfonyl hydrazide), etc. Any of the well-known solvent blowing agents can also be used in this invention, as for example, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound which decomposes to yield at least one mole of gas per mole of blowing agent at a temperature of 190° C. or less can be used.

Any poly(sulfonazide) can be used as the cross-linking agent in the preparation of the partially expanded polypropylene pellets of this invention. Thus, any compound having the general formula $$R \text{---} [SO_2N_3]_x$$

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10-decane-bis(sulfonazide), 1,11-undecane - bis(sulfonazide), 1,12-dodecane-bis(sulfonazide), 7-oxa-tridecane-1,13-bis(sulfonazide), 6-thiaundecane-1,11-bis(sulfonazide); chloroaliphatic poly(sulfonazide)s such as the poly(sulfonazide) produced from a chloro- and sulfochlorinated mixture of petroleum hydrocarbons and containing at least one chlorine atom and at least two sulfonazide groups per molecule; 1,9,18-octadecane - tris(sulfonazide), poly(ethylene sulfonazide), poly(sulfonazido-methyl styrene), 1,3- and 1,4-bis(sulfonazido-methyl benzene), 1,3-benzene bis(sulfonazide), 1 - octyl - 2,4,6 - benzene tris(sulfonazide), 4,4'-diphenylmethane bis(sulfonazide), 4,4'-diphenyl ether bis(sulfonazide), 4,4' - bis-octadecyl biphenyl-3,5,3',5'-tetra(sulfonazide), 4,4'-diphenyl disulfide bis(sulfonazide), 1,6-bis(4'-sulfonazidophenyl) hexane, 2,7-naphthalene bis(sulfonazide), etc.

The amount of the poly(sulfonazide) utilized in the preparation of these partially expanded pellets can be varied over a wide range. It must be an amount that is sufficient to prevent rupture of the cell walls when the foaming action takes place. Generally, it will be an amount of from about 0.01% up to about 2% by weight of the polymer, although higher concentrations can be used if desired. The amount of blowing agent incorporated will obviously depend upon the degree of blowing desired in the final foam; that is, the density desired for the final foamed product and the type of blowing agent used.

As pointed out above, the temperature at which the partial expansion and cross-linking is carried out in the preparation of the expandable pellets of this invention will depend on several factors, but always will be at least above the softening temperature of the mixture of the polypropylene, cross-linking agent and blowing agent up to a temperature of about 275° C. The softening temperature of the mixture will depend upon whether the blowing agent is a solvent type or a chemical type. Thus, with a solvent type, the polypropylene will at least partially dissolve so that the softening temperature of the blend can be as low as 135° C. On the other hand, with a chemical blowing agent, the softening temperature of the blend will be the melting point of the polymer and, hence, will be about 165° C. Accordingly, for solvent blowing the cross-linking and blowing temperature will be from the softening temperature up to about 275° C., and for chemical blowing it will be from the softening temperature, i.e., about 165° C. up to about 275° C., and preferably from about 190° C. to about 250° C.

Many variations can be made in the process of this invention and in the expandable compositions of this invention without departing from the invention. Thus, there can be incorporated in the polypropylene used or in the preparation of the expandable pellets of polypropylene, blowing agent, and cross-linking agent, such additives as light and heat stabilizers for the polypropylene, dyestuffs and pigments, flame retardants, including organic and inorganic flame retardants, such as chlorinated paraffin wax, antimony oxide and other such materials, etc. For the preparation of more flexible foams, natural and synthetic elastomers may be incorporated, as for example, ethylene-propylene copolymers, ethylene-propylene-diene terpolymers, polyisobutylene, etc. Many other variations will be apparent to those skilled in the art.

The following examples will illustrate the preparation of the partially expanded and cross-linked polypropylene compositions of this invention and their use in the preparation of molded shaped articles. All parts and percentages are by weight unless otherwise indicated.

*Example 1*

In this example a chloroaliphatic poly(sulfonazide) was used as the cross-linking agent. It was prepared as follows: Sulfur dioxide (300 ml. of gas per minute) was passed into a solution of 31.2 grams of a commercial mixture of hydrocarbons containing 11 and 12 carbon atoms per molecule in 200 ml. of carbon tetrachloride. After five minutes the mixture was exposed to the light from an ultraviolet lamp three inches from the reactor, and chlorine was passed in at the rate of 77 ml. per minute. The combined gases were passed in for 223 minutes while holding the temperature at 25° C. After turning off the light and the gases, the solvent was removed under vacuum whereby there was obtained a viscous oil which, on analysis, was found to contain 16.6% of sulfur and 29.2% of chlorine. To a solution of 11.2 g. of this chlorosulfonated hydrocarbon in 150 ml. of acetone was added drop-wise a solution of 7.8 g. of sodium azide in 25 ml. of water while stirring with a magnetic stirrer. After stirring for one hour at room temperature, the reaction mixture was heated at 60° C. for 3 hours. Stirring was continued for 16 hours at room temperature, after which the solvent was removed and the resulting mixture was diluted with 150 ml. of chloroform. The solution so obtained was washed with water and dried. On removing the diluent there was obtained 9.7 g. of an amber viscous oil which, on analysis, was found to contain 5.4 milliequivalents of azide per gram and 11.7% chlorine.

A partially expanded composition in the form of expandable pellets was prepared by mixing in acetone 100 parts of a stereoregular polypropylene having an RSV of 2.4 with 0.25 part of the above chlorohydrocarbon poly(sulfonazide), and 1.5 parts of azo bis(formamide) as blowing agent, evaporating the acetone and passing the mixture through an extruder at 193° C. to yield a partially blown strand. This strand was then chopped into pellets. These pellets, which were about 70% expanded, were packed into a closed mold which was heated for 15 minutes at 204° C. At this temperature the polymer was further cross-linked and simultaneously expanded to completely fill the mold. On opening the mold, the cross-linked, foamed polypropylene was observed to possess a tough surface with a void-free, uniform internal cell structure with more than 50% of the cells closed. The foamed article had an approximate density of 20 lbs./cu. ft.

*Example 2*

A partially expanded composition in the form of expandable pellets was prepared by mixing in acetone 100 parts of a stereoregular polypropylene having an RSV of 2.7 with 0.25 part of 1,10-decane-bis(sulfonazide) and 2.0 parts of azo bis(formamide), evaporating the acetone and passing the mixture through an extruder at 180° C. to yield a partially blown strand. This strand which was about 65% expanded was chopped into pellets. The pellets were packed into a closed mold which was heated for 15 minutes at 204° C. On opening the mold, the shaped article had a tough surface and a cross-section of it showed it to be free of voids and to have a uniform cell structure with more than 50% of the cells closed. The approximate density of the foam was 20 lbs./cu. ft.

In addition to their use in the preparation of molded shaped articles, the partially expanded and cross-linked polypropylene pellets of this invention can be used in many other processes of preparing articles made of cellular materials, as for example, in the manufacture of foam sheets, wire and cable coatings and other electrical conductor insulation, the manufacture of blown articles such as tubing, bottles, etc., and other such applications.

*Example 3*

A mixture of 100 parts of a stereoregular polypropylene having an RSV of 3.4, 2.3 parts of azo bis(formamide), and 0.5 part of the chlorohydrocarbon poly(sulfonazide) used in Example 1 was blended on a two-roll mill at 171° C. for 8 minutes and then sheeted off the mill and chopped into pellets. These pellets were about 5% expanded and had a density of about 54 lbs./cu. ft.

A portion of these partially expanded pellets were charged to an injection molder operating at a barrel temperature of 227° C., pressure of 18,000 p.s.i., and cycle time of 1 minute overall with a 2-second injection time, injecting in a 4 cu. in. mold. The foam cubes so obtained had a density of 11 lbs./cu. ft. and a coarse cell structure with more than 50% cells closed.

Another portion of the 5% expanded pellets (353 grams) was charged into a 10 x 10 x 0.25 inch picture frame mold which was heated to 227° C. in a press at 500 p.s.i. for 4.5 minutes. The press was opened and the foamed product had a density of 7.5 lbs./cu. ft. with a very fine cell structure, with 90% of the cells closed.

*Example 4*

A mixture of 100 parts of a stereoregular polypropylene having an RSV of 3.4, 5 parts of azo bis(formamide), and 0.3 part of 1,9-nonane bis(sulfonazide) was blended on a two-roll mill at 171° C. for 4 minutes. The blend was then sheeted off the mill and heated at 227° C. under a nitrogen pressure of 800 p.s.i. for 3.5 minutes. After cooling 10 minutes, the pressure was released and the partially foamed sheet was chopped into pellets. They had a density of about 46 lbs./cu. ft. Three hundred grams of these pellets, which were about 20% expanded, were packed into a 10 x 10 x 0.25 inch mold and heated for 4.5 minutes at 227° C. in a press under a pressure of 500 p.s.i., after which the press was opened. The foam so obtained had a density of 6 lbs./cu. ft. and had a uniform structure with more than 50% of the cells closed.

*Example 5*

The procedure of Example 4 was repeated, except that 0.35 part of the 1,9-nonane bis(sulfonazide) was used instead of 0.3 part and the sheet of blended mixture was heated under a nitrogen pressure of 400 p.s.i. instead of the 800 p.s.i. used in that example. The pellets so obtained were about 50% expanded and had a density of about 31 lbs./cu. ft. The 10 x 10 x 0.25 inch mold was charged with 205 grams of these pellets and heated at 227° C. in a press under 500 p.s.i. for 4 minutes. The foamed product so obtained had a density of 7 lbs./cu. ft. with more than 50% of the cells closed.

What we claim and desire to protect by Letters Patent is:

1. As a new composition of matter, an expandable composition comprising a partially cross-linked and expanded blend of stereoregular polypropylene, a blowing agent which yields at least one mole of gas per mole of blowing agent at a temperature within the range of softening temperature of said composition to about 190° C., and from about 0.01% to about 2%, based on the weight of polypropylene, of a poly(sulfonazide) as the cross-linking agent, said blend having been partially cross-linked and expanded to from about 5% to about 75% of the potential expansion of the blend.

2. The expandable polypropylene composition of claim 1 wherein the poly(sulfonazide) is an aliphatic poly(sulfonazide).

3. The expandable polypropylene composition of claim 1 wherein the aliphatic poly(sulfonazide) is a chloroaliphatic hydrocarbon compound containing a plurality of sulfonazide groups.

4. The expandable polypropylene composition of claim 1 wherein the expansion is from about 50% to about 75% of the potential expansion of the blend.

No references cited.

MURRAY TILLMAN, *Primary Examiner.*

MORTON FOELAK, *Assistant Examiner.*